United States Patent [19]

Silverberg

[11] Patent Number: 4,670,773
[45] Date of Patent: Jun. 2, 1987

[54] METHOD FOR COMPATIBLE INCREASE IN RESOLUTION FOR COLOR TELEVISION TRANSMISSION SYSTEMS WITH REDUCTION OF CROSS-TALK NOISE IN MOTION ADAPTIVE PICTURE PROCESSING

[75] Inventor: Michael Silverberg, Beckum, Fed. Rep. of Germany

[73] Assignee: ANT Nachrichtentechnik GmbH, Backnang, Fed. Rep. of Germany

[21] Appl. No.: 779,598

[22] Filed: Sep. 24, 1985

[30] Foreign Application Priority Data

Sep. 26, 1984 [DE] Fed. Rep. of Germany ....... 3435264

[51] Int. Cl.[4] .......................................... H04N 11/06
[52] U.S. Cl. .......................................... 358/12; 358/16
[58] Field of Search ...................... 358/12, 15, 16, 31, 358/24

[56] References Cited

U.S. PATENT DOCUMENTS

| 2,716,151 | 8/1955 | Smith ........................... 358/12 |
| 4,343,017 | 8/1982 | Wilkinson .................... 358/31 |
| 4,345,268 | 8/1982 | Clarke ......................... 358/31 |
| 4,485,401 | 11/1984 | Tan et al. ..................... 358/12 |
| 4,543,598 | 9/1985 | Oliphant ....................... 358/12 |
| 4,621,286 | 11/1986 | Reitmeier et al. ............ 358/141 |

FOREIGN PATENT DOCUMENTS

| 3344524 | 6/1985 | Fed. Rep. of Germany ........ 358/12 |
| 120366 | 1/1985 | Japan .................................... 358/12 |
| 190085 | 9/1985 | Japan .................................... 358/12 |
| 2079091 | 1/1982 | United Kingdom .................. 358/31 |

OTHER PUBLICATIONS

Article by Broder Wendland, "High Quality Television by Signal Processing", Nov. 1983; 9 pages.

Primary Examiner—John W. Shepperd
Attorney, Agent, or Firm—Spencer & Frank

[57] ABSTRACT

A method for transmitting a color television signal between a transmitting station and a receiving station of a television system and for compatibly increasing picture resolution at the receiving station. In order to reduce crosstalk noise during motion adaptive picture processing of the color television signal with increased resolution, the following measures are taken: the offset modulation or offset sampling frequency is reduced; additional signals to increase resolution are limited in bandwidth at the transmitter; the chromaticity spectrum is obtained at the transmitter from a full frame sequence of the picture and is bandwidth limited at the transmitter in the direction of vertical spatial frequencies; the luminance signal and the additional signals are complementarily filtered at the receiver; and finally, at the receiver, the chromaticity spectrum is obtained from a full frame of the transmitted color television signal.

3 Claims, 46 Drawing Figures

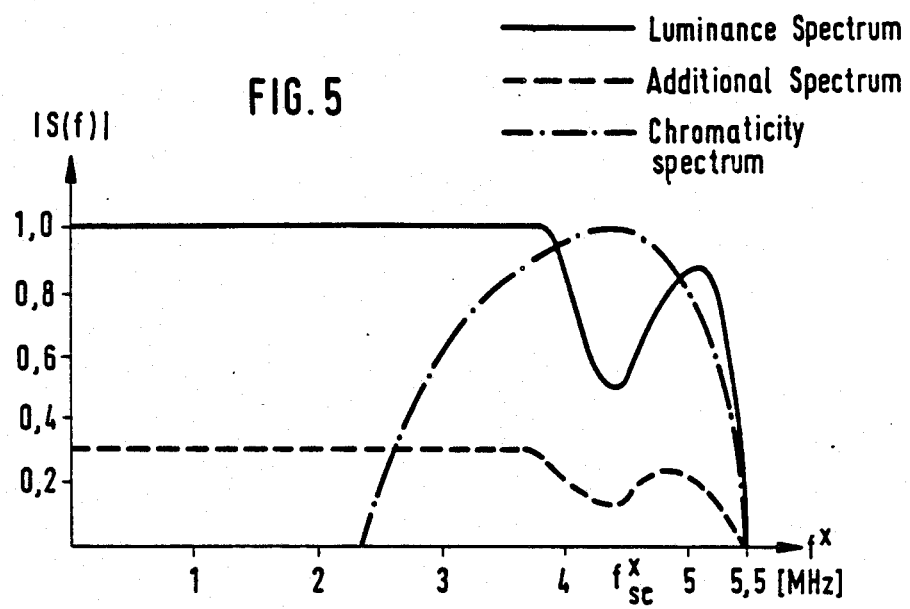
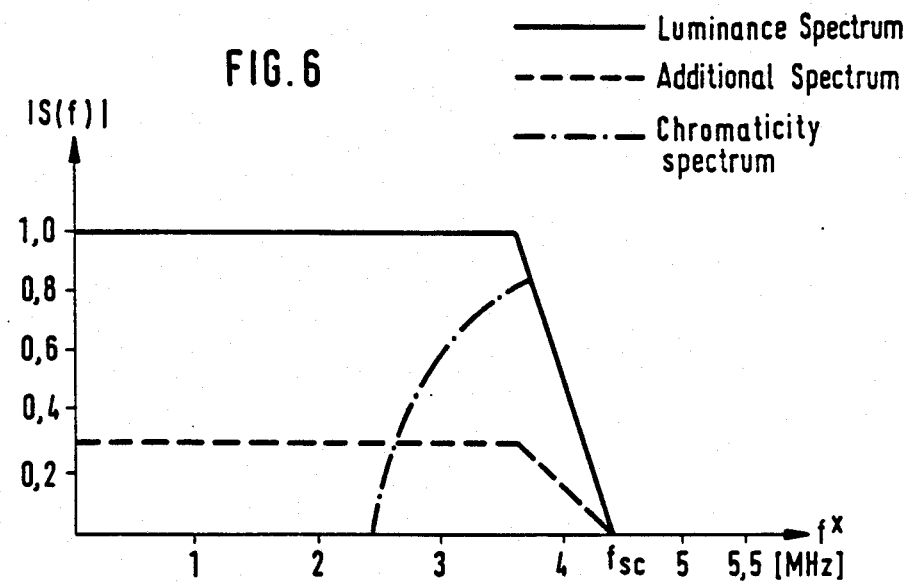

METHOD FOR COMPATIBLE INCREASE IN RESOLUTION FOR COLOR TELEVISION TRANSMISSION SYSTEMS WITH REDUCTION OF CROSS-TALK NOISE IN MOTION ADAPTIVE PICTURE PROCESSING

BACKGROUND OF THE INVENTION

The present invention relates to the transmission of a television signal containing a luminance signal between a transmitting station and a receiving station of a television system, and more particularly to a method for compatibly increasing picture resolution at the receiving station including: (a) effecting planar prefiltering of the luminance signal at the transmitting station and a corresponding planar postfiltering of the luminance signal at the receiving station; (b) effecting offset sampling or offset modulation of the luminance signal at the transmitting station and a corresponding sampling conversion or demodulation of the luminance signal at the receiving station; (c) deriving an additional signal from the luminance signal for increasing picture resolution and reducing the amplitude of the additional signal at the transmitting station and transmitting the additional signal to the receiving station; and (d) increasing the amplitude of the additional signal at the receiving station to an extent corresponding to the reduction performed during said reducing step. Such a method is disclosed in U.S. patent application Ser. No. 680,292, filed on Dec. 10, 1984, the disclosure of which is incorporated herein by reference.

In the above-identified application, the offset sampling or offset modulation procedure is utilized to obtain greater detail resolution while maintaining compatibility with existing transmission systems. Undesirable noise components produced by the offset sampling or offset modulation process are reduced in amplitude. However, the measures disclosed in the above-identified application can be used only for the transmission of essentially static television pictures.

SUMMARY OF THE INVENTION

It is therefore an object of the present invention to improve upon the above-described method to provide motion adaptive picture processing at low and medium motion velocity, with cross-talk noise, particularly cross-luminance noise, being avoided or effectively suppressed, respectively.

The above and other objects are accomplished according to the invention by improvements to the foregoing method wherein the step of (b) effecting offset sampling or offset modulation is effected utilizing, respectively, offset sampling or offset modulation having a frequency which is reduced to a value which (1) lies below the maximum possible resolution of the picture in the horizontal direction for offset sampling or offset modulation and which (2) is selected so that the resolution of the picture in the horizontal direction is substantially equal to the maximum possible resolution of the picture in the vertical direction; and wherein the method further includes:

(e) effecting lowpass filtering of the additional signal at the transmitting station with a maximum limit frequency which substantially corresponds to the difference between the chrominance subcarrier frequency and the frequency of the sampling signal or offset modulation, respectively;

(f) take from claim 1;

(g) effecting bandwidth limiting of the chromaticity spectra of the television signal in the direction of vertical spatial frequencies at the transmitting station;

(h) filtering the luminance signal and the additional signal at the receiving station with respective filter arrangements which have complementary frequency responses; and (i) recovering the chromaticity spectra at the receiving station from a full frame of the transmitted color television signal A further aspect of the invention includes transmitting the chrominance subcarrier without additional frequency band limitation in the horizontal direction for low motion velocities up to 0.24 pel/frame; and effecting time filtering of the luminance signal at the receiving station to reduce cross-luminance.

Another aspect of the invention includes filtering the chrominance subcarrier in the horizontal direction with a lowpass filter at the transmitting station, the lowpass filter having a frequency cut-off which is selected so that the frequencies of the additional signal and of the chromaticity spectra do not overlap.

The advantages of the invention are in particular that it is possible, with little additional circuitry, to reduce cross-talk noise to such an extent that, as tests have shown, the observer no longer discerns any such cross-talk noise. Since the chromaticity spectra do not overlap at the receiver, it is possible to separate the U and V chromaticity subcarrier components at the receiver by vertical filtering. Accurate quadrature demodulation is therefore no longer necessary. The measures of the present invention permit utilization of the advantages of offset modulation for moving picture transmission up to about 2 pixels per frame.

Before the invention is described in detail, the prerequisites for the invention are discussed in connection with an increase in resolution and moving picture transmission.

The drawings described below are provided to explain these prerequisites and to describe the invention.

BRIEF DESCRIPTION OF THE DRAWINGS

FIG. 2 is a block circuit diagram showing a color television transmission system operating according to the PAL offset method.

FIG. 5 is a signal diagram showing the frequency response for a bandwidth limited PAL offset spectrum.

FIG. 6 is a signal diagram showing the frequency response of the PAL offset spectrum after Nyquist filtering at the receiver.

DESCRIPTION OF THE PREFERRED EMBODIMENTS

Figure 1:
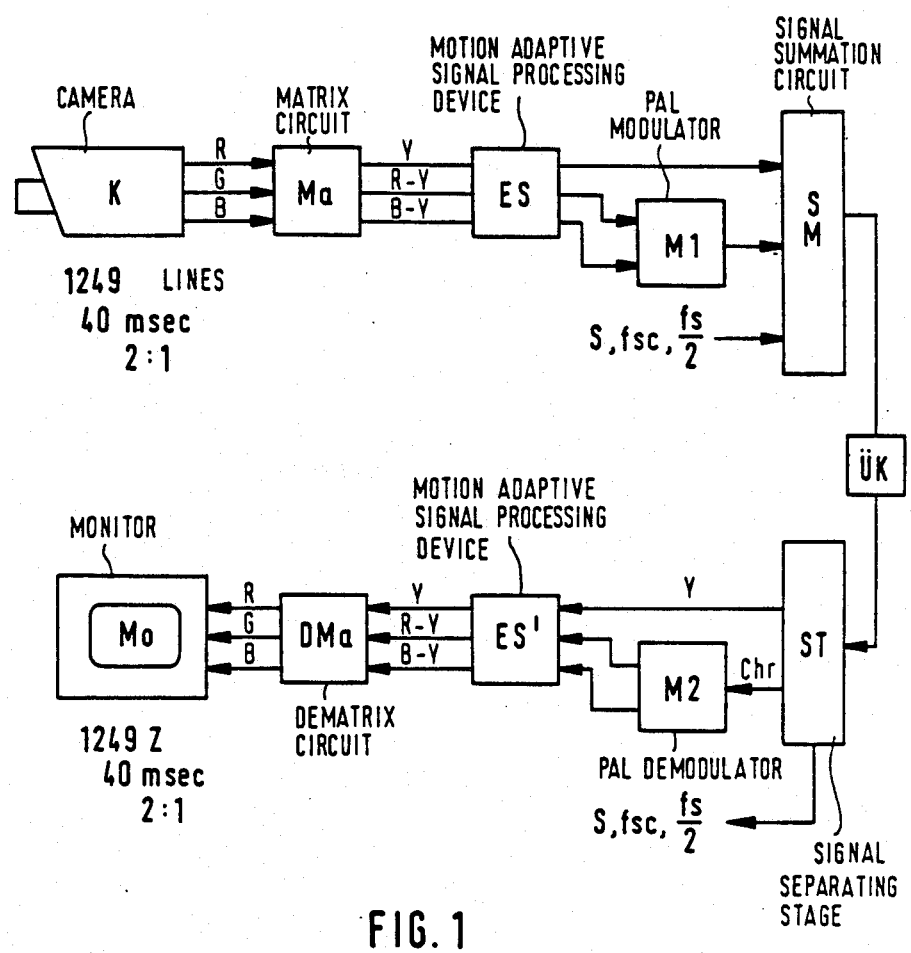
FIG. 1 is a generalized block circuit diagram for a color television transmission system with motion adaptive picture processing for implementing the method according to the invention.

In an article by Broder Wendland entitled "High Quality Television by Signal Processing", published in connection with the Second International Conference on New Systems and Services in Telecommunication, Liege, November 1983, a concept is disclosed for motion-adaptive picture processing which permits improvements in quality while assuring compatibility with existing systems. This concept is explained in greater detail below in conjunction with the method disclosed in U.S. patent application Ser. No. 680,292 and with reference to FIG. 1 herein.

A high definition camera K furnishes a sequence of pictures having 1249 lines per 40 msec in the line interlace method of 2:1. This sequence of pictures is separated in a matrix circuit Ma into the chrominance subcarrier signals R-Y and B-Y as well as the luminance signal Y. These signals are fed to a device ES for motion adaptive signal processing. This device ES is composed of modules for full frame display, diagonal filtering and offset modulation which will be described elsewhere below.

In picture regions having motion velocities of no more than 2 pel/frame, processing of frames at, for example, 25 frames per second is still sufficient without creating loss of sharpness. The poor time resolution permits an increase in spatial resolution. In picture regions which exhibit more movement, full frame processing, however, results in highly annoying jerky movements so that in this case a change must be made to field processing with a correspondingly higher time resolution, for example at 50 frames per second. With unchanging channel capacity, this field processing method now exhibits less spatial resolution which, however, is not discernible to the human eye and thus does not result in loss of quality. The change between full frame and field processing is effected by a motion detector in the device ES. After motion adaptive prefiltering, which also takes place in device ES, a sequence of pictures results which has the following format: 625 lines/40 msec/2:1. In PAL modulator M1, the chrominance subcarrier signals R-Y and B-Y are processed into a PAL chrominance signal and are then combined in a signal summation circuit Sm with a motion adaptively preprocessed luminance signal Y to form a compatible FBAS signal. After signal summation, transmission takes place over transmission channel ÜK.

Signal processing at the receiver is the same as at the transmitter. First the FBAS signal is separated in signal separating stage ST into luminance signal Y and chrominance signal Chr. The chrominance signal first passes through PAL demodulator M2 and is then fed, together with luminance signal Y, to a device ES' at the receiver for motion adaptive signal processing. This device ES' at the receiver is composed of modules for full frame display, diagonal filtering and offset demodulation. In picture regions having high motion velocity, the time resolution of 50 frames per second is maintained; this is followed by vertical interpolation. In weakly moving picture regions, a sequence of full frames is obtained from the incoming line interlace signal and this sequence is displayed with high spatial resolution. Device ES at the transmitter as well as device ES' at the receiver are controlled by two independent motion detectors. Device ES' is connected to a dematrix circuit DMa for processing the luminance signal Y and the chrominance subcarrier signals R-Y and B-Y. Each picture is then displayed on monitor Mo with increased resolution in 1249 lines, with line interlacing at 2:1, within 40 msec.

For motion velocities up to 2 pel/frame, as mentioned above, time resolution of 25 frames/second is sufficient. The higher spatial resolution for this process is realized in this case by offset modulation. The design of such a system, in modified form, is disclosed in the aforementioned U.S. application Ser. No. 680,292 and will now be described with reference to FIG. 2.

Figure 3:
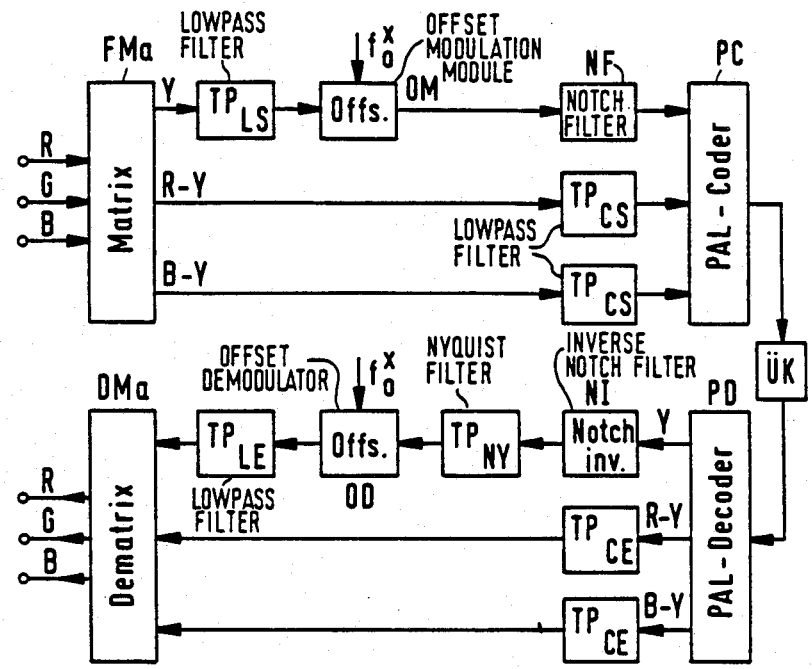
FIG. 3 is a signal diagram showing the spatial frequency domain spectrum for a diagonally prefiltered luminance signal.

The RGB full frame signal (1:1) coming from a picture source (color television camera) and composed of 625 lines per 40 msec is converted in color matrix FMa to a luminance signal Y and two chrominance subcarrier signals R-Y and B-Y. Luminance signal Y with its spatial frequencies $f^x$ and $f^y$ is prefiltered by means of lowpass filter $TP_{LS}$ in the direction of diagonal spatial frequencies so that the signal spectrum shown in FIG. 3 results. In the $f^x$ direction the bandwidth is limited to $F_s{}^x = 8$ MHz and in the $f^y$ direction, the spectrum is repeated at multiples of $F_s{}^y = 312.5$ c/ph (cycles per picture height).

To further explain the nomenclature "cycles per picture height" the following prerequisites will be helpful. A television signal may be described by a three-dimensional function with x and y being the variables in the plane and t being the temporal variable. A so defined function s(x, y, t) possesses the following three-dimensional Fouriertransformation:

$$s(x,y,t) \circ\!\!-\!\!\bullet \int_{-\infty}^{\infty} \int_{-\infty}^{\infty} \int_{-\infty}^{\infty} s(x,y,t) \cdot e^{-j2\pi f^x \cdot x} \cdot e^{-j2\pi f^y \cdot y} \cdot e^{-j2\pi f_t \cdot t} dx \cdot dy \cdot dt$$

wherein $f^x$ has the dimension cycles/length respectively cycles/picture width, $f^y$ has the dimension cycles/height respectively cycles/picture height, and $f_t$ has the dimension cycles/second. Cycles/picture width and cycles/picture height are standardized dimensions.

Figure 4:
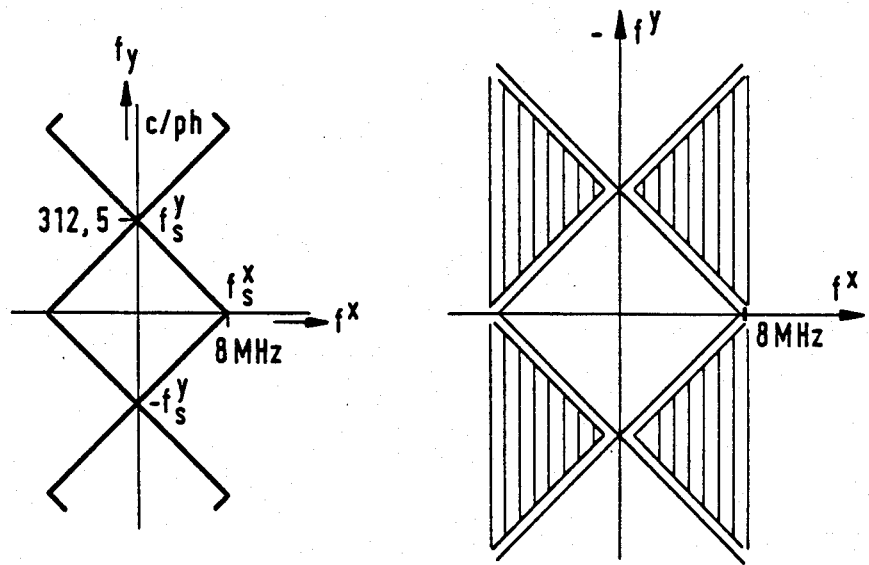
FIG. 4 is a signal diagram showing the spatial frequency domain spectrum of the luminance signal after offset modulation.

The offset modulation in offset modulation module OM at offset modulation frequency $f_o{}^x = 8.0$ MHz produces the luminance signal spectrum shown in FIG. 4. The hatched areas in this signal spectrum are lowered in amplitude by the factor 0.3 during offset modulation. These areas in the signal spectrum are produced during offset modulation (see U.S. application Ser. No. 680,292), and must be lowered in amplitude for reasons of compatibility. They will hereinafter be called the "additional spectrum".

As shown in FIG. 5, luminance spectrum and additional spectrum in the region of the chrominance subcarrier are reduced by about 6 dB so as to reduce cross-color noise. The additional spectrum is additionally reduced by 10 dB so as to reduce the 25 Hz flicker interference and the cross-color noise in compatible receivers. This is done by notch filter NF (FIG. 2). Before the PAL modulation, the chrominance subcarrier signals are lowpass filtered to 2.1 MHz by means of chromaticity signal lowpass filters $TP_{CS}$. In PAL coder PC, the signals are coded and summed into a compatible FBAS signal. At the receiver, the FBAS signal passes through PAL decoder PD which splits the signal into its components Y, R-Y (also referred to as the U component) and B-Y (also referred to as the V component). The R-Y and B-Y components are filtered in respective low pass filters $TP_{CE}$ and passed on to Dematrix DMa.

Figure 7:
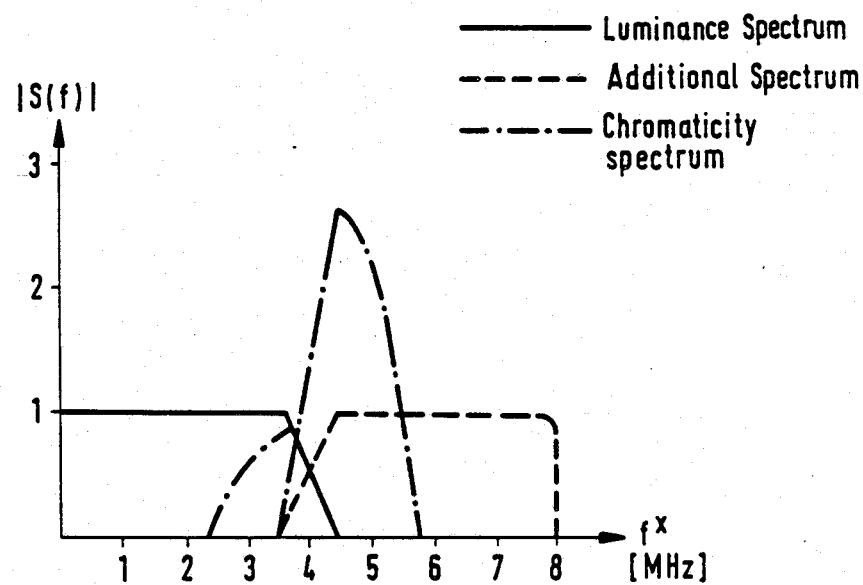
FIG. 7 is a signal diagram showing the frequency response of the PAL spectrum after offset demodulation and lowpass filtering.

In contradistinction to conventional PAL decoders, this embodiment does not have a notch filter in the path of the luminance signal so as to avoid a loss in resolution in the range of the chrominance subcarrier; to the contrary, the inverse notch filter NI downstream of PAL decoder PD eliminates the signal reduction effected at the transmitter in the region of the chrominance subcarrier so that downstream of this inverse notch filter NI, the frequency curve is planar. This of course also raises the chromaticity spectrum which even intensifies cross-luminance noise. At the output of Nyquist filter $TP_{NY}$ the spectrum shown in FIG. 6 is obtained. The remaining chromaticity spectrum is clearly visible in the luminance signal. After offset demodulation in offset demodulator OD at the receiver with amplitude raising and diagonal postfiltering by means of lowpass filter $TP_{LE}$, the spectrum shown in FIG. 7 results.

The remaining chromaticity spectrum appears, on the one hand, in its normal position in the luminance component and, on the other hand, reflected at the 4 MHz axis and raised by 10 dB in the additional component. The reduction of the additional spectrum at the transmitter so as to reduce flicker and cross-color noise, must be paid for, due to the necessary increase at the receiver, with increased cross-luminance noise. Subjective tests have shown that if the signal is raised by 10 dB at the receiver, the chromaticity spectrum should be lowered by about 28 dB to reach the detection limit for cross-luminance noise. If one looks at the carrier frequency chromaticity spectrum of FIG. 5, it becomes apparent that in the region of the chrominance subcarrier frequency ($f_{sc}{}^x$) the luminance spectrum is reduced by only 6 dB; thus crosstalk from the luminance channel to the chrominance channel cannot generally be prevented. Since the additional spectrum was additionally lowered by 10 dB, its contribution to cross-color noise is correspondingly lower. As tests have shown, in an improved receiver, quality is adversely affected during a transmission according to PAL offset primarily due to cross-luminance noise. Therefore, measures would have to be taken to separate the individual spectral components. These measures should reduce the quality of the compatible receiver and of the improved receiver only insignificantly.

In the presently realized system for PAL offset transmission (FIG. 2), the luminance spectrum and the additional spectrum are Nyquist filtered and then offset demodulated. In this way, error free combination of the depth component (luminance) and the height component (additional spectrum) is realized. But this requires that the center of the cut-off frequency characteristic of the Nyquist filter be at half the sampling frequency. In the realized system, the cut-off frequency extends from 3.6 to 4.4 MHz. Consequently, the luminance spectrum and the additional spectrum must be transmitted at least to 4.4 MHz. In addition to the cross-color noise that this produces, it can also not be avoided that a major portion of the chromaticity spectrum remains in the luminance signal and produces intensive cross-luminance noise.

Figure 8A:
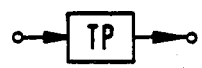
FIGS. 8a–8d show circuit arrangements in block circuit diagram form and corresponding frequency curves for the generation of complementary frequency responses for implementing the method according to the invention.
Figure 8B:
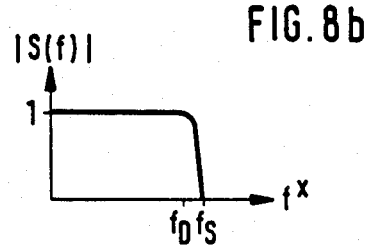
Figure 8C:
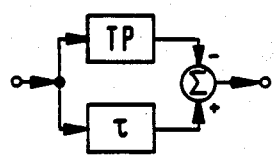
Figure 8D:
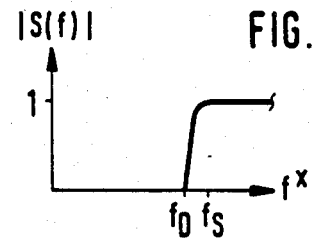
Figure 9A:
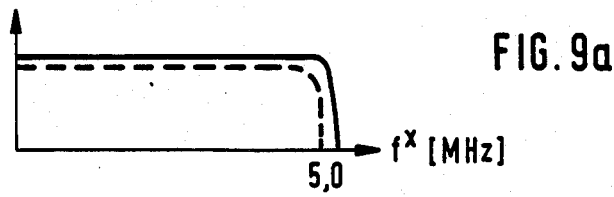
FIGS. 9a–9d are signal diagrams showing the frequency responses of the signal spectra to be filtered or already filtered, respectively, at the receiver.
Figure 9B:
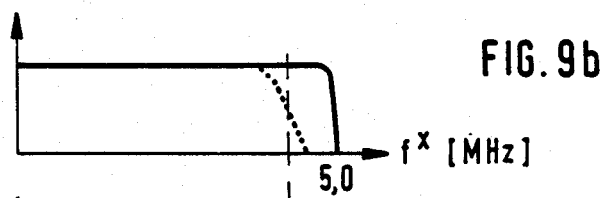
Figure 9C:
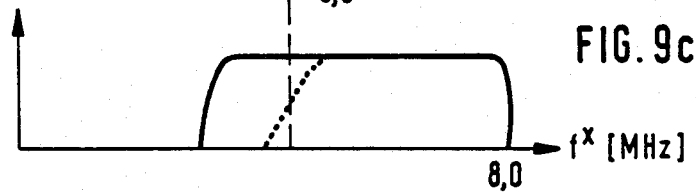
Figure 9D:
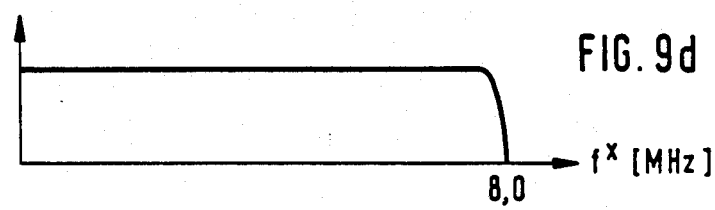

A signal filtering method will now be described which does not need to meet the requirement of the center of the cut-off frequency characteristic of the Nyquist filter being at half the sampling frequency and therefore brings significant advantages over prior realizations. So-called "complementary filtering" is effected for the height and depth components. FIGS. 8a-8d show circuit arrangements and corresponding frequency responses for generating such complementary frequency responses. Lowpass filter TP according to FIG. 8a is assumed to produce the frequency response shown in FIG. 8b. The circuit arrangement shown in FIG. 8c, composed of the parallel connection of lowpass filter TP and a delay member $\tau$ with subsequent combination of the signal outputs via a summing member $\Sigma$, with lowpass filter TP being brought to the subtracting input and the delay member to the summing input of the summing member, produces a frequency response as shown in FIG. 8d. For error-free combination of the depth and height components, the luminance spectrum must be filtered by means of a lowpass filter according to FIG. 8a and the offset modulated additional spectrum must be filtered by means of the circuit arrangement of FIG. 8c. FIGS. 9a-9d show the frequency responses of the signal spectra to be filtered or already filtered, respectively. FIG. 9a shows the depth and height components at the input of the receiver. The position of the depth component alone is shown in FIG. 9b. After offset demodulation, the height component has the shape shown in FIG. 9c. The dotted lines in FIGS. 9b and 9c represent the two complementary filter frequency cut-off characteristics. FIG. 9d shows the error-free combination of depth and height components.

Figure 10:
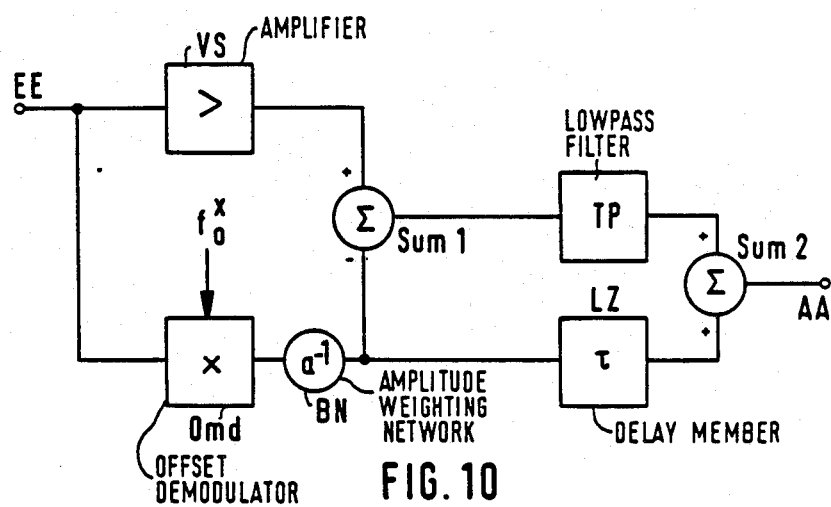
FIG. 10 is a block circuit diagram showing a circuit arrangement for a modified offset demodulator which can be used for implementing the method according to the invention.
Figure 11:
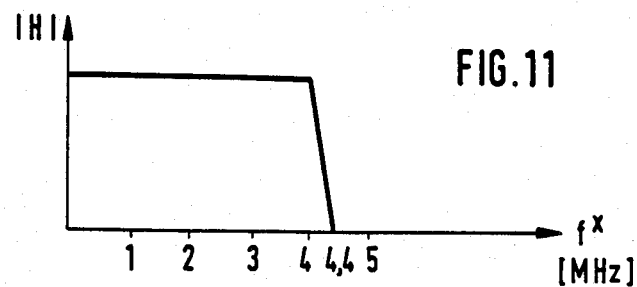
FIG. 11 is a signal diagram showing the frequency response of the lowpass filter in the modified offset demodulator of FIG. 11.

FIG. 10 shows a circuit arrangement for a thus modified offset demodulator. Compared to the previously realized version, demodulation and filtering are here exchanged. Receiver input EE of FIG. 10 is connected, on the one hand, with an amplifier VS and, on the other hand, with offset demodulator Omd which receives the offset demodulation frequency $f_o^x$. Downstream of offset demodulator Omd, there is provided an amplitude weighting network BN (see U.S. patent application Ser. No. 680,292) which raises the additional spectrum again by means of the signal reduction factor $a^{-1}$ which is inverse to a. The output of amplifier VS is connected to the summing input of summing member Sum1 and the output of amplitude weighting network BN is connected to the subtracting input of summing member SUM1. The output of amplitude weighting network BN is connected, via delay member LZ having a delay of $\tau$, to a summing input of a further summing member Sum2 and the output of the first summing member Sum1 is connected, via lowpass filter TP, to a second summing input of summing member Sum2. The demodulated picture signal can be obtained for further processing at output AA of second summing member Sum2. With this modified offset demodulation, which is based on complementary filtering by means of lowpass filter TP and delay member LZ, the shape and position of the lowpass filter cut-off frequency characteristic no longer depends on the offset modulation frequency $f_o^x$. FIG. 11 shows the transfer function of lowpass filter TP in the modified offset demodulator according to FIG. 10. Until a horizontal spatial frequency of $f^x=4$ MHz is reached, the frequency response as shown by the transfer function H is constant and after this value it decreases linearly until it reaches the $f^x$ axis at a frequency of $f^x=4.4$ MHz.

Figure 12:
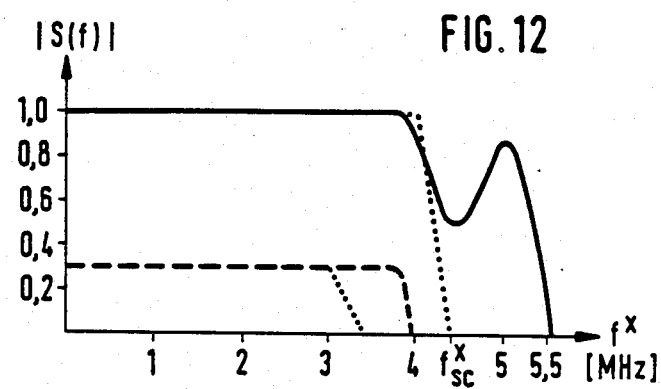
FIG. 12 is a signal diagram showing the frequency response of the luminance spectrum and of the additional signal spectrum with modified offset demodulation.

The fact that the shape and position of the lowpass filter cut-off frequency characteristic no longer depends on the offset demodulation frequency $f_o^x$ can be interpreted as a newly gained degree of freedom which can be utilized to realize a crosstalk-free PAL offset transmission system. If offset demodulation is employed, the resolution in the $f^y$ direction is theoretically 312.5 c/ph, which, when converted, corresponds to 7.37 MHz; the resolution in the $f^x$ direction, however, is 8 MHz. Since the resolution should be approximately the same in both directions, it is permissible to reduce the offset modulation frequency or the offset demodulation frequency, respectively, to about 7.4 MHz. The thus obtained savings in bandwidth can be utilized, in connection with the above-described modified offset demodulation, to reduce cross-talk noise. This fact will be explained in greater detail with reference to FIG. 12. The offset modulation frequency (and thus also the resolution in the $f^x$ direction) is fixed at about 7.4 MHz (the precise value corresponds to a whole number multiple of the line frequency). The luminance signal is transmitted as before up to 5 MHz, with the spectral components in the range of the chrominance subcarrier being reduced by 6 dB. It is here assumed that lowpass filter TP in the offset modulator has a cut-off frequency from 4.0 to 4.4 MHz; this permits utilization of the depth component "up to the chrominance subcarrier". To obtain the original bandwidth of 7.4 MHz, the additional spectrum is utilized up to 3.4 MHz. The dotted lines represent the curves for the filter cut-off frequencies. Since the additional spectrum at the receiver is utilized only up to 3.4 MHz, it can be lowpass filtered to this range at the transmitter thus considerably reducing cross-color noise. If the chrominance subcarrier signals are lowpass filtered to 1 MHz, cross-talk of the chrominance into the additional spectrum can be prevented. This prevents additional cross-luminance noise as a result of the offset modulation.

To better illustrate these facts, a multi-dimensional spectral illustration will be used hereafter.

To be able to accurately illustrate conditions during PAL offset transmission, it is necessary to produce a three-dimensional equation for the spectrum of the video signal. In addition to the two spatial domain frequencies $f^x$ and $f^y$, it is necessary to divide the time component $f^t$. It is assumed that the picture source furnishes a full frame sequence of 25 pictures/sec, each picture having 625 lines. After appropriate prefiltering, the luminance signal and the chrominance subcarrier signal are converted to the synthetic line interlace and are offset and PAL modulated, respectively. The coded FBAS signal passes through the transmission channel and is available at the receiver in the synthetic line interlace. Synthetic line interlace means in this case a signal with 625 lines/40 msec/2:1 (interlace) generated out of a signal with 25 pictures/second; each picture having 625 lines (non interlace). After reconversion to a full frame sequence (e.g., 625 lines/40 msec/ 1:1) one obtains the following expression for the spectrum of the FBAS signal:

$$
\begin{aligned}
S_{FBA}(f^x, f^y, f^t) = \Bigg\{ &\sum_n \sum_r B_Y(f^x, f^y - nf_c^y, f^t - rf_v^t) + \\
&a \sum_n \sum_r B_Y(f^x + f_o^x, f^y - nf_c^y + f_c^y, f^t - rf_v^t) + \\
&a \sum_n \sum_r B_Y(f^x - f_o^x, f^y - nf_c^y - f_c^y, f^t - rf_v^t) + \\
&\sum_n \sum_r B_Y(f^x, f^y - nf_c^y, f^t - rf_v^t)(-)^n + \\
&a \sum_n \sum_r B_Y(f^x + f_o^x, f^y - nf_c^y + f_c^y, f^t - rf_v^t)(-)^n + \\
&a \sum_n \sum_r B_Y(f^x - f_o^x, f^y - nf_c^y - f_c^y, f^t - rf_v^t)(-)^n + \\
&\sum_r \sum_n B_U(f^x + f_{sc}^x, f^y - nf_c + \tfrac{1}{2}f_c^y, f^t - rf_v^t + \tfrac{1}{2}f_v^t) + \\
&\sum_r \sum_n B_U(f^x - f_{sc}^x, f^y - nf_c^y - \tfrac{1}{2}f_c^y, f^t - rf_v^t - \tfrac{1}{2}f_v^t) + \\
&e^{-j2\pi T_H \tfrac{1}{2}f_v^t} \sum_r \sum_n B_U(f^x + f_{sc}^x, f^y - nf_c^y + \\
&\tfrac{1}{2}f_c^y, f^t - rf_v^t + \tfrac{1}{2}f_v^t)(-)^n + \\
&e^{j2\pi T_H \tfrac{1}{2}f_v^t} \sum_r \sum_n B_U(f^x - f_{sc}^x, f^y - nf_c^y - \\
&\tfrac{1}{2}f_c^y, f^t - rf_v^t - \tfrac{1}{2}f_v^t)(-)^n - \\
&\tfrac{1}{j} \sum_n \sum_r B_V(f^x + f_{sc}^x, f^y - nf_c^y - \tfrac{1}{2}f_c^y, f^t - rf_v^t - \tfrac{1}{2}f_v^t) + \\
&\tfrac{1}{j} \sum_n \sum_r B_V(f^x - f_{sc}^x, f^y - nf_c^y + \tfrac{1}{2}f_c^y, f^t - rf_v^t + \tfrac{1}{2}f_v^t) - \\
&\tfrac{1}{j} e^{j2\pi T_H \tfrac{1}{2}f_v^t} \sum_n \sum_r B_V(f^x + f_{sc}^x, f^y - nf_c^y - \\
&\tfrac{1}{2}f_c^y, f^t - rf_v^t - \tfrac{1}{2}f_v^t)(-1)^n + \\
&\tfrac{1}{j} e^{-j2\pi T_H \tfrac{1}{2}f_v^t} \sum_n \sum_r B_V(f^x - f_{sc}^x, f^y - nf_c^y + \\
&\tfrac{1}{2}f_c^y, f^t - rf_v^t + \tfrac{1}{2}f_v^t)(-)^n \Bigg\} \cdot a \quad (1)
\end{aligned}
$$

$$H_K(f^x, f^y, f^t) \cdot f_v^t f_c^y \cdot e^{-j2\pi T_H f^t} = :a(1a)$$

where $B_Y$ = picture spectrum of the luminance signal,
$B_U$ and $B_V$ = picture spectra of the chrominance subcarrier signals,
$f_o^x$ = offset modulation frequency,
$F_c^x$ = band limit in the vertical direction,
$f_v^t$ = full frame sampling frequency: 25 Hz
$f_{sc}^x$ = modulation frequency for the PAL modulator
$H_K(f^x, f^y, f^t)$ = transfer function of the transmission channel
a = amplitude weighting factor: $0 < a < 1$
n and r = natural numbers 1, 2, 3, . . .
$T_H$ = 20 msec
$f_c^y$ = 312,5 c/ph
$f^t$ = time component (cycles/second)

Figure 13:
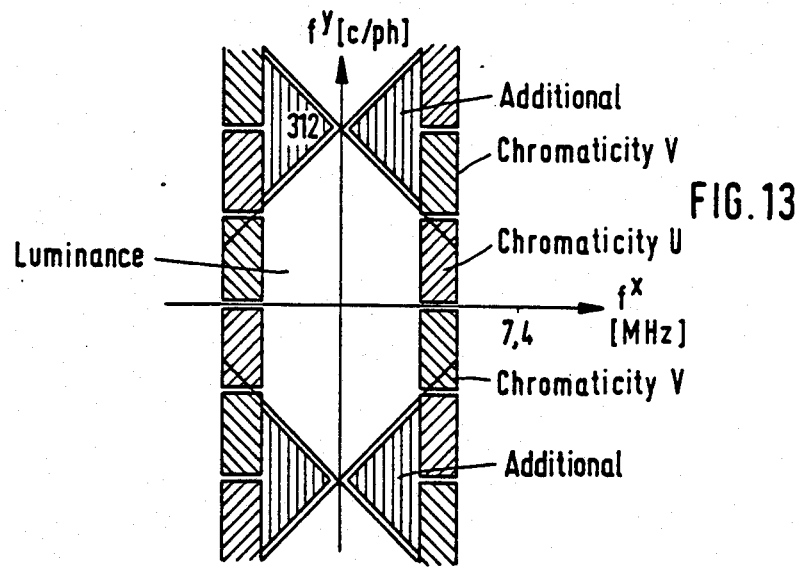
FIG. 13 is a signal diagram showing the signal spectrum for a complete, offset modulated FBAS signal.

FIG. 13 shows the spectrum of Equation 1 in the $f^x f^y$ plane. Transmission channel ÜK effects lowpass filtering in the $f^x$ direction to 5 MHz (converted). The boldly outlined region represents the depth component of the luminance signal. The spectrum of the height component is shown in the vertically hatched regions.

The chromaticity spectra shown in FIG. 13 by diagonal hatching, is repeated in the $f^y$ direction (in contradistinction to the line interlace system) every 312.5 c/ph, with the U and V components appearing alternately. If the chrominance subcarrier signals at the transmitter are prefiltered to 78 c/ph, which when converted, corresponds to 1.85 MHz, the chromaticity spectra will not overlap.

This makes possible a separation of the U and V components at the receiver by vertical filtering; an accurately operating quadrature demodulation is then no longer necessary. Falsifications of hue due to phase errors then no longer occur. The separation of the chrominance subcarrier spectra at the receiver by means of vertical filtering constitutes an improvement of the present-day standard PAL demodulation.

Accurate evaluation of Equation (1) brings the result that the amplitude of the chromaticity spectra at $f^y = \pm 78$ c/ph is less by about 7.7 dB than at $f^y = 312.5$ c/ph $\pm 78$ c/ph. The luminance spectra have a standardized amplitude factor of 2.0, while the chromaticity spectrum at $f^y = \pm 78$ c/ph has an amplitude factor of 0.76. The improved receiver utilizes the depth component up to 4.4 MHz, so that the chromaticity spectra produce cross-luminance at $f^y = \pm 78$ c/ph. But this is not critical since at these points the chromaticity spectra appear with a reduced amplitude. As shown in connection with FIG. 12, the additional spectrum is being utilized at the receiver only up to 3.4 MHz so that at the transmitter it can be filtered to this bandwidth. In this way, crosstalk of the additional spectrum into the chromaticity spectra is prevented. If the chrominance subcarrier signals are lowpass filtered to 1 MHz (in the $f^x$ direction), additional spectrum and chromaticity spectrum do not overlap. Thus the U and V spectra can be recovered from the full frame with a base bandwidth of 1 MHz and without cross-color noise (at locations $f^y = 312$ c/ph $\pm 78$ c/ph); moreover, the offset demodulation will then not produce any additional cross-luminance noise.

A complete transmission system with motion adaptive signal processing will now be described in detail with reference to FIGS. 14 and 15. The system is based on the concept shown in FIG. 1. The starting point is again a high definition picture source, e.g. a high definition camera having the following specifications: 1249 lines/40 msec/2:1. Block MK1 represents the color matrix and a converter. In block MK1, the RGB signals are matrixed and put out in parallel in two modes:
  first mode—25 frames per second;
  second mode—50 frames per second.

The Y, U and V signals are processed correspondingly in both modes. A motion detector BWD1 softly switches potentiometers P1 and P2, which are controlled by motion detector BWD1, between the first and second modes. Potentiometer P1 is provided to switch luminance signal Y and potentiometer P2 is provided to switch chrominance subcarrier signals U and V. As a whole, a distinction must be made between three velocity ranges which will be discussed below:
 1. low velocities—$V \leq 0.24$ pel/frame;
 2. medium velocities—$0.24$ pel/frame $\leq V \leq 2$ pels/frame; and
 3. high velocities—$V \geq -2$ pels/frame.

Figure 16:
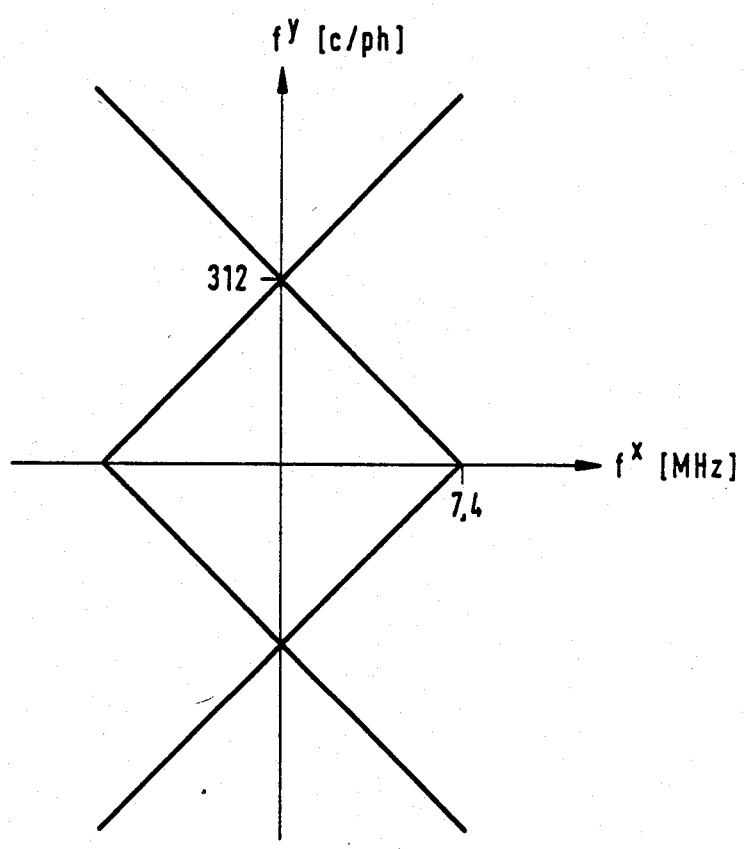
FIG. 16 is a signal diagram showing the luminance spectrum after diagonal filtering at the transmitter of FIG. 14.

For low and medium velocities, 25 frames/sec are to be transmitted in conjunction with the offset modulation. At high velocities, 50 frames/sec are transmitted in conjunction with vertical filtering. The luminance signal containing 25 frames/sec is diagonally prefiltered by full frames in diagonal filter DF1 which results in the luminance signal having the spatial frequency domain spectrum shown in FIG. 16. In the $f^x$ direction it has a resolution, when converted, of 7.4 MHz and in the $f^y$ direction it has a resolution of 312.5 c/ph. Thus the resolutions in both directions are equivalent.

Figure 14:
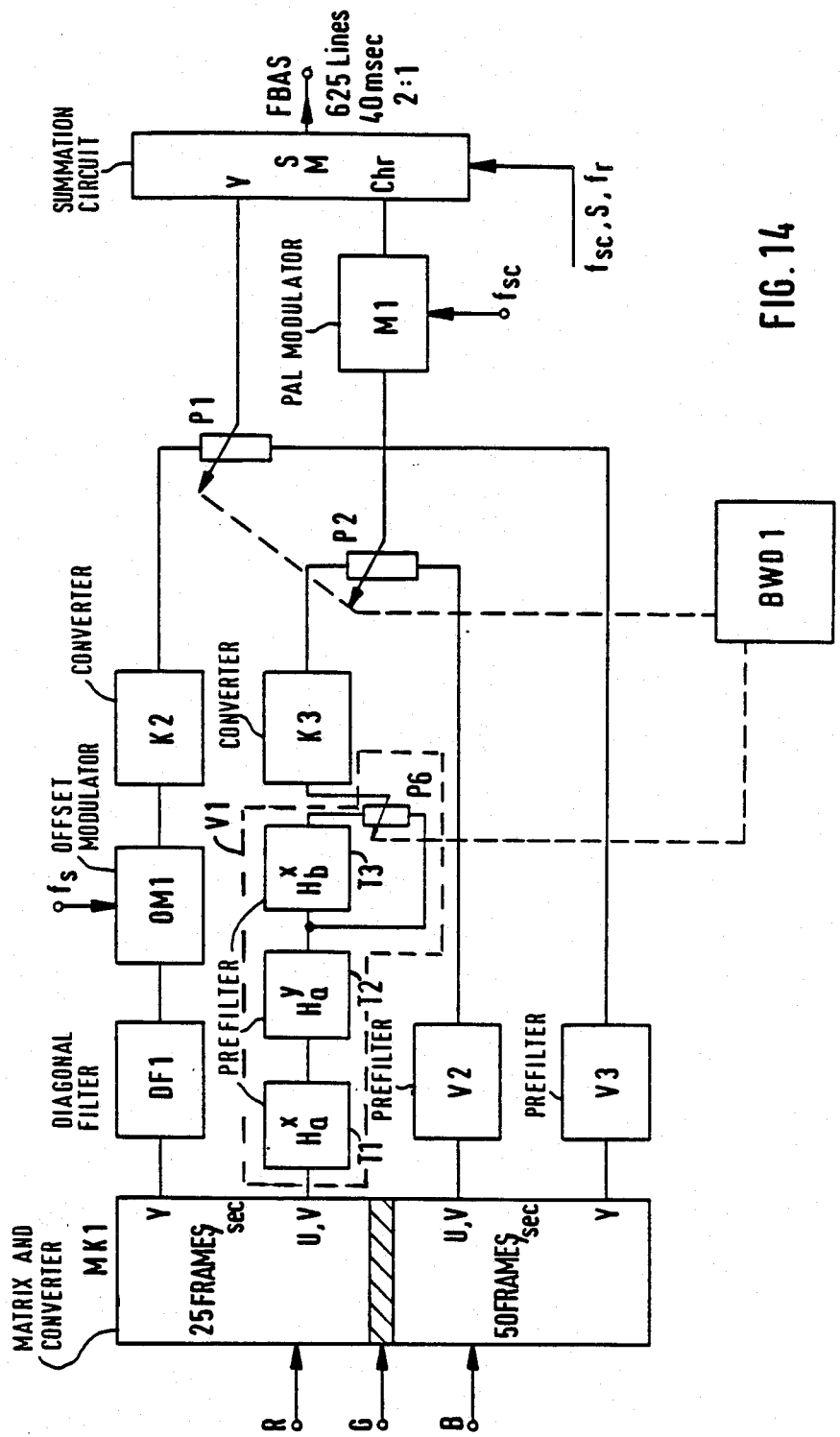
FIG. 14 is a block circuit diagram of a transmitter for motion adaptive picture transmission which can be used for implementing the method according to the invention.
Figure 38:
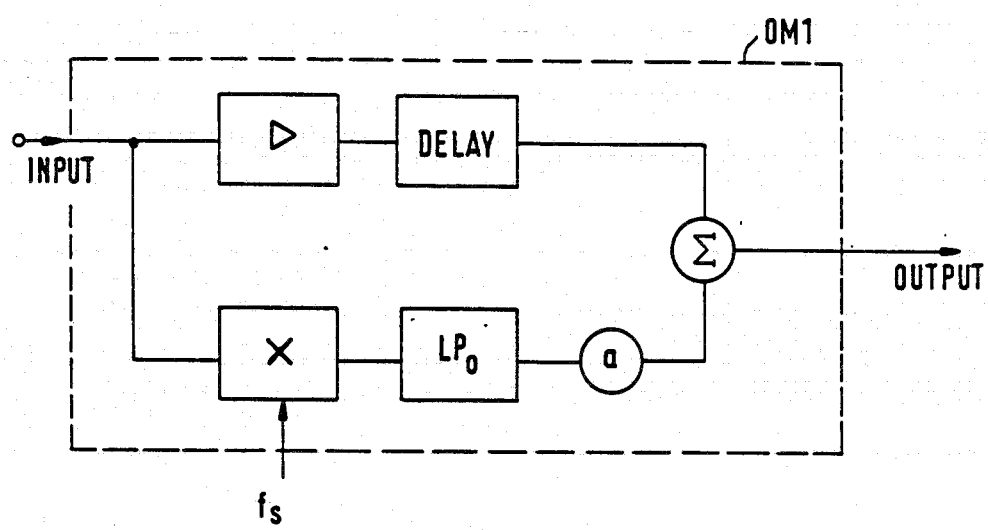
FIG. 38 is a block circuit diagram showing the offset modulation stage OMI of the transmitter of FIG. 14.
Figure 39:
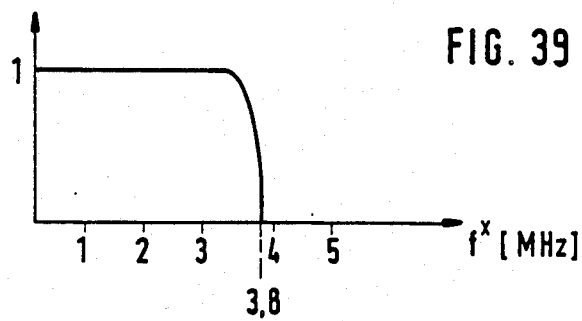
FIG. 39 is a diagram of the frequency response of low pass filter LPo of FIG. 38.

FIG. 38 is a block circuit diagram showing the offset modulation stage OM1 in the transmitter of FIG. 14. The low pass filtering LPo of the additional signal is shown by the frequency response characteristic of FIG. 39.

Figure 17:
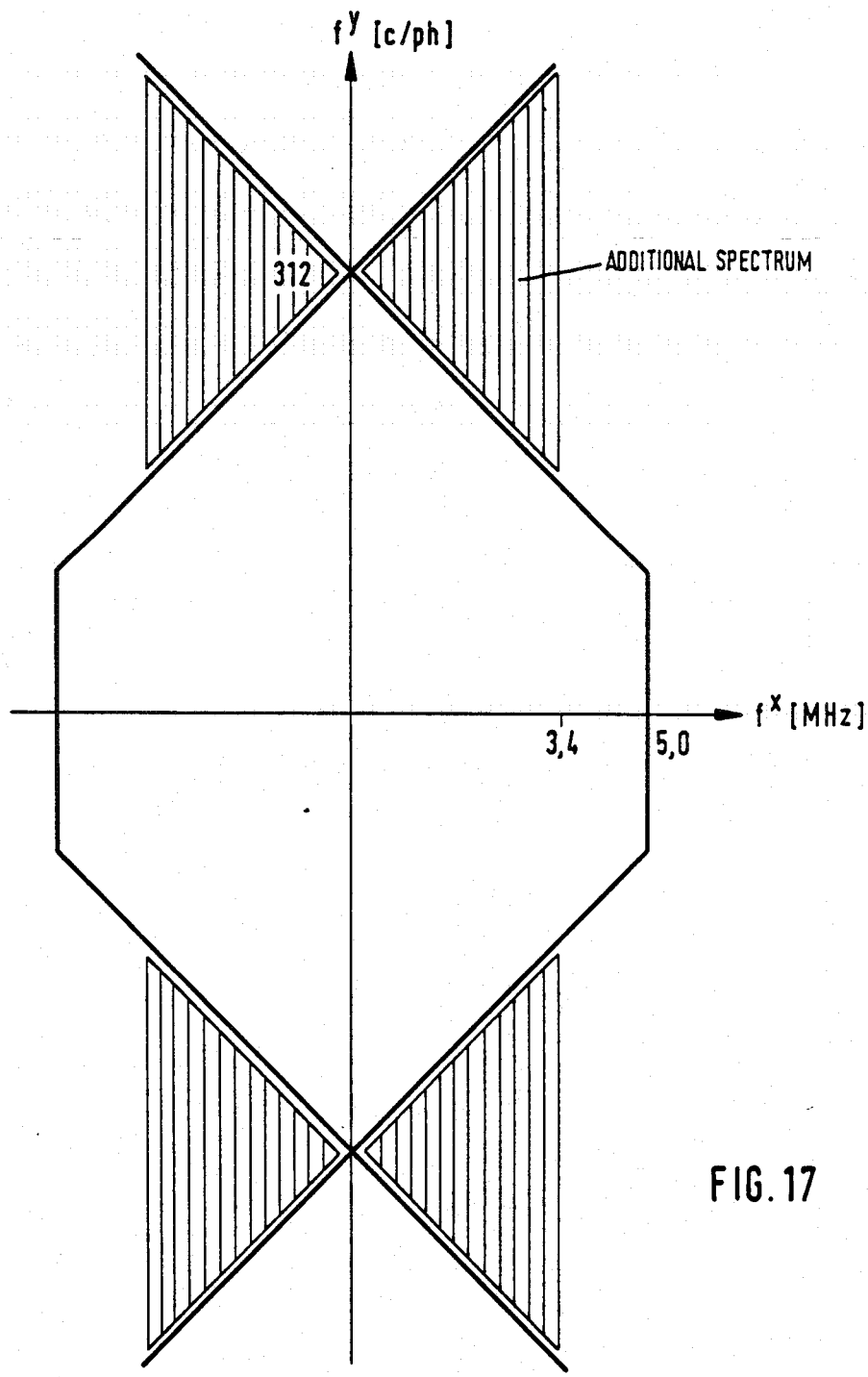
FIG. 17 is a signal diagram showing the luminance spectrum after offset modulation at the transmitter.
Figure 18:
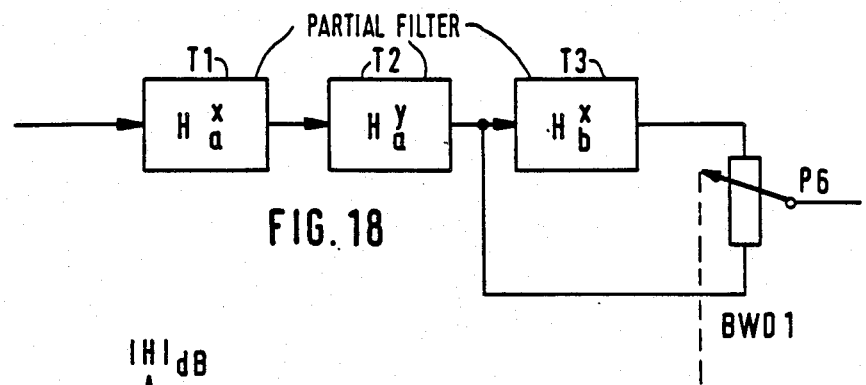
FIG. 18 is a block circuit diagram of prefilter V1 in FIG. 14.

FIG. 17 shows the spectrum at the output of offset modulator OM1. The hexagonal spectral region represents the luminance spectrum after appropriate channel filtering (lowpass filtering to 5 MHz). The hatched regions are the height components of the basic signal; hereinafter they will be called "additional spectra".

For compatibility reasons, the additional spectrum is reduced by about 10 dB at the transmitter and is raised again in the improved receiver. At the transmitter, the additional spectrum is lowpass filtered in the $f^x$ direction to 3.4 MHz. The spectrum according to FIG. 17 can be reconverted to a spectrum according to FIG. 16 with the aid of the above-described "modified offset demodulation" (see FIG. 8c).

Figure 19:
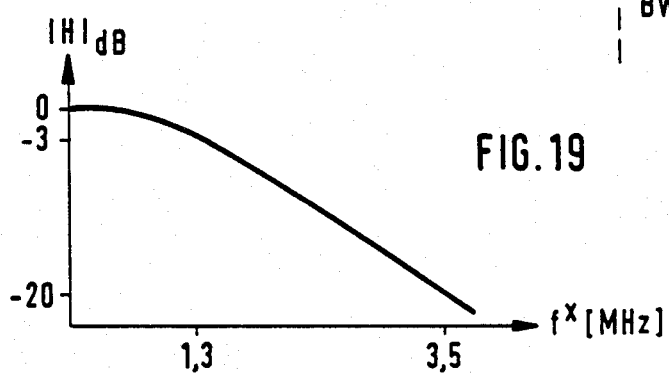
FIG. 19 is a signal diagram showing the frequency response of the first partial filter T1 in FIG. 18.
Figure 20:
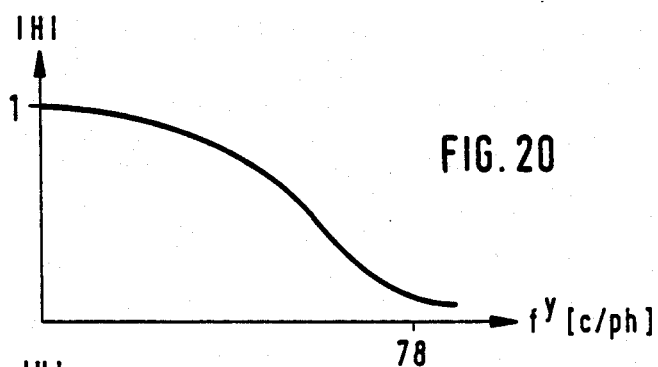
FIG. 20 is a signal diagram showing the frequency response of the second partial filter T2 in FIG. 18.

Converter K2 converts the offset modulated picture sequence into a synthetic line interlace signal at 625 lines/40 msec/2:1. If offset modulation is employed (step f in claim 1), the chromaticity spectrum likewise has a time resolution of 25 frames/sec. Preprocessing is effected by prefilter V1. FIGS. 18 through 21 are schematic representations of the operation of prefilter V1. As evident in FIG. 18, prefilter V1 is composed of a cascade connection of partial filters T1, T2 and T3. These produce the transfer functions $H_a{}^x$, $H_a{}^y$ and $H_b{}^x$. Initially, the chrominance subcarrier signals according to FIG. 19 are lowpass filtered in the $f^x$ direction (partial filter T1). This filter curve is standardized according to CCIR. Then there occurs vertical lowpass filtering to 78 c/ph (partial filter T2; FIG. 20); which when converted, is 1.85 MHz. This filtering must be "soft" to avoid overshooting and ringing (Thomson characteristic). This means a gentle transition between passband and stopband.

For low motion velocities, partial filter T3 and transfer function $H_b{}^x$ are without effect (potentiometer P2 at its lower abutment) so that the filter functions of partial filters T1 and T2 are cascaded at the output of prefilter V1 as shown in FIGS. 19 and 20.

Figure 21:
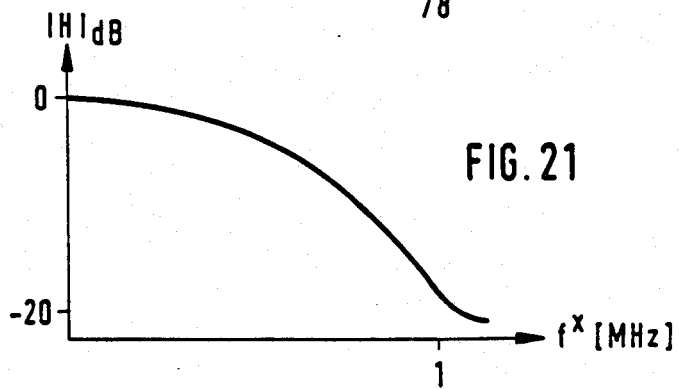
FIG. 21 is a signal diagram showing the frequency response of the third partial filter T3 in FIG. 18.

For medium motion velocities, potentiometer P2 is at its upper abutment so that now filter T3 with its transfer function $H_b{}^x$ also becomes effective with the frequency response shown in FIG. 21. The result is a lower resolution of the chrominance subcarrier signals in the $f^x$ direction compared to lower velocities.

Switching between the two filter modes is likewise soft, which means a gentle transition between passband and stopband (Thomson characteristic as mentioned before). The frequency response according to FIG. 21 must be "soft" to keep overshooting at a minimum.

At low motion velocities, the resolution of the chrominance subcarrier signals in the $f^x$ direction remains unchanged compared to the standard PAL system. At medium velocities, the resolution in the $f^x$ direction is limited to about 1 MHz. Converter K3 converts the filtered chrominance subcarrier signals to a format of 625 lines/40 msec/2:1.

Figure 22:
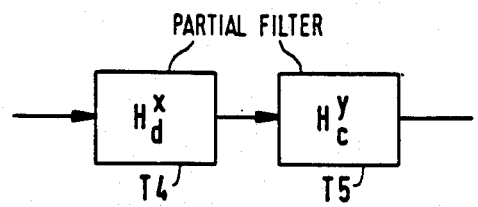
FIG. 22 is a block circuit diagram of prefilter V3 in FIG. 14.
Figure 23:
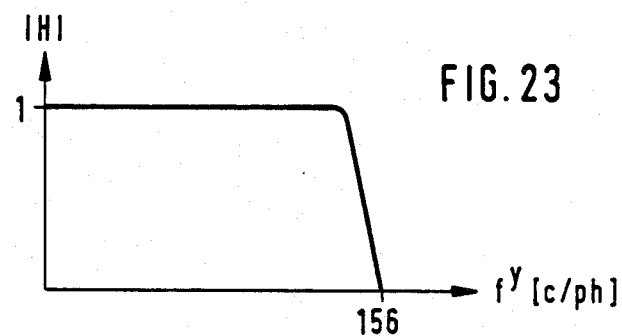
FIG. 23 is a signal diagram showing the frequency response of partial filter T4 in FIG. 22.
Figure 24:
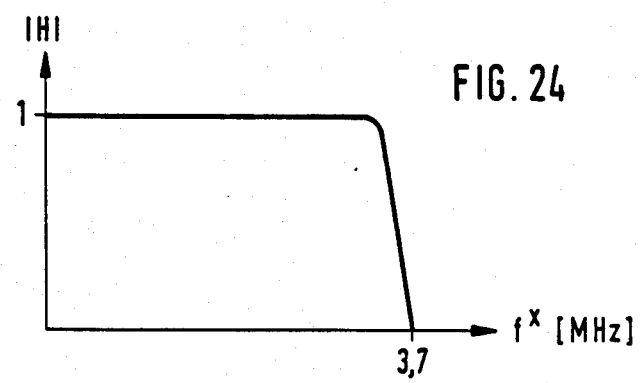
FIG. 24 is a signal diagram of the frequency response of partial filter T5 in FIG. 22.
Figure 25:
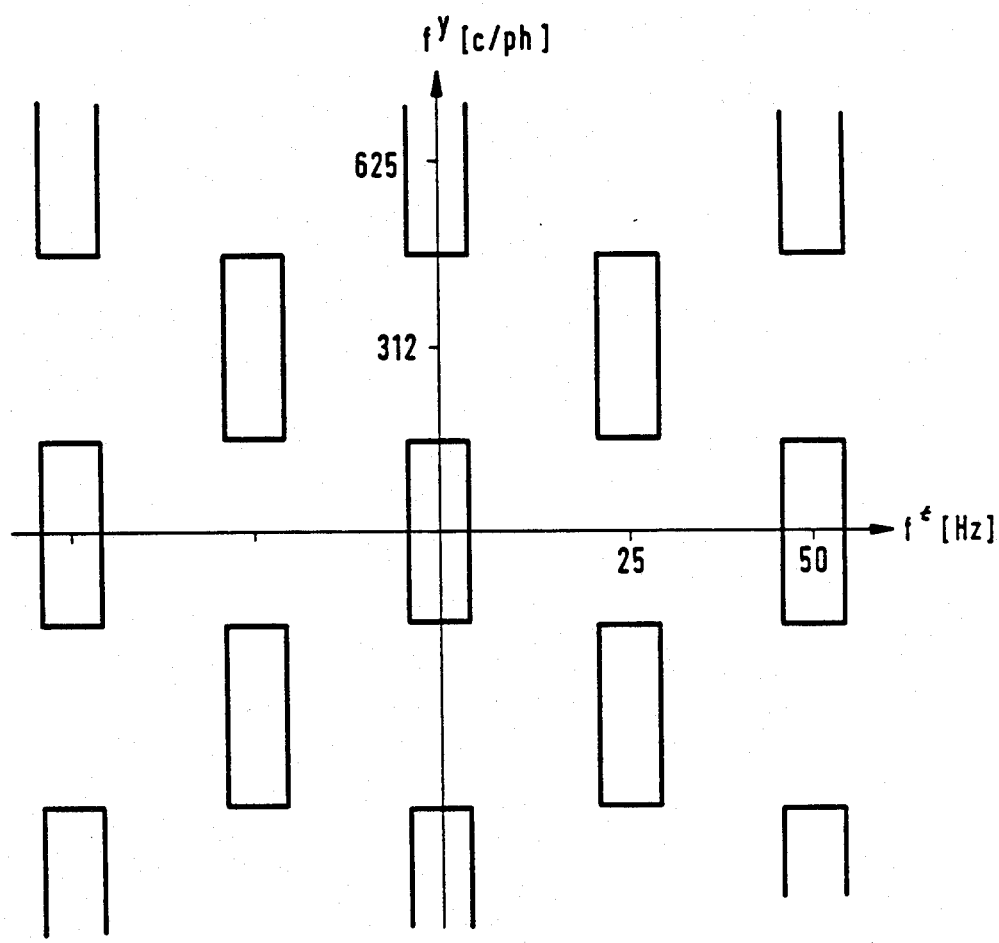
FIG. 25 is a signal diagram showing the luminance spectrum at the output of prefilter V3 in FIG. 14.
Figure 26:
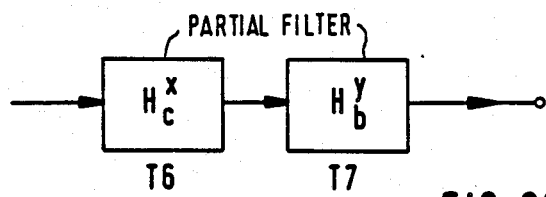
FIG. 26 is a block circuit diagram of prefilter V2 in FIG. 14.
Figure 27:
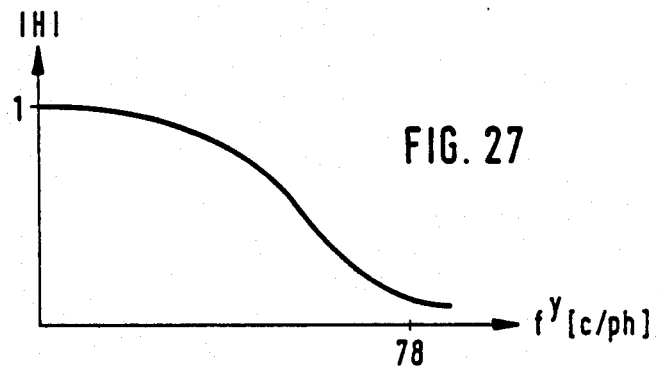
FIG. 27 is a signal diagram showing the frequency response of partial filter T6 in FIG. 26.
Figure 28:
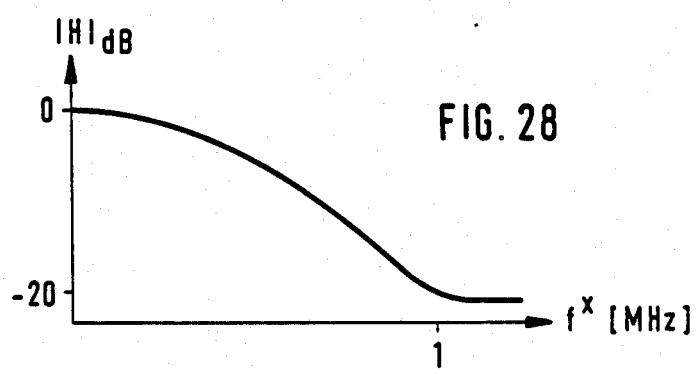
FIG. 28 is a signal diagram showing the frequency response of partial filter T7 in FIG. 26.

At high motion velocities, 50 frames/sec are being processed. Luminance signal Y is then processed by prefilter V3 shown in FIG. 22. Prefilter V3 is composed of cascade connected partial filters T4 and T5. FIGS. 23 and 24 show the frequency responses of the two partial filters T4 and T5 with their transfer functions $H_d{}^x$ and $H_c{}^y$. In the $f^x$ direction, the luminance spectrum is filtered to about 3.7 MHz, in the $f^y$ direction to 156 c/ph. This again makes the resolution the same in both directions. FIG. 25 shows the Y spectrum at the output of prefilter V3 in the $f^y f^t$ plane. By means of vertical interpolation at the receiver, flicker effects (25 Hz flicker) can be suppressed. The chrominance subcarrier signals are treated by prefilter V2 (FIGS. 26, 27, 28). Prefilter V2 is composed of the cascade connection of partial filters T6 and T7. The frequency responses of partial filters T6 and T7 are shown in FIGS. 27 and 28.

The chrominance subcarrier signals are filtered to 78 c/ph in the $f^y$ direction. In the $f^x$ direction, there occurs lowpass filtering to about 0.7 to 1.0 MHz. This filtering must also occur without overshooting. Converters K2 and K3 are provided for matching signal formats. Motion detector BWD1 makes soft changes between the signals of converter K2 and of prefilter V3 and between the signals of converter K3 and prefilter V2. Thereafter, the chrominance subcarrier signals are modulated in PAL modulator M1 and are combined in a summation circuit SM, together with the luminance signal, into a compatible FBAS signal. Additionally, a reference signal is inserted into the FBAS signal for synchronizing the offset demodulation, for example, as described in U.S. patent application Ser. No. 722,364, the disclosure of which is also incorporated herein by reference.

Figure 29:
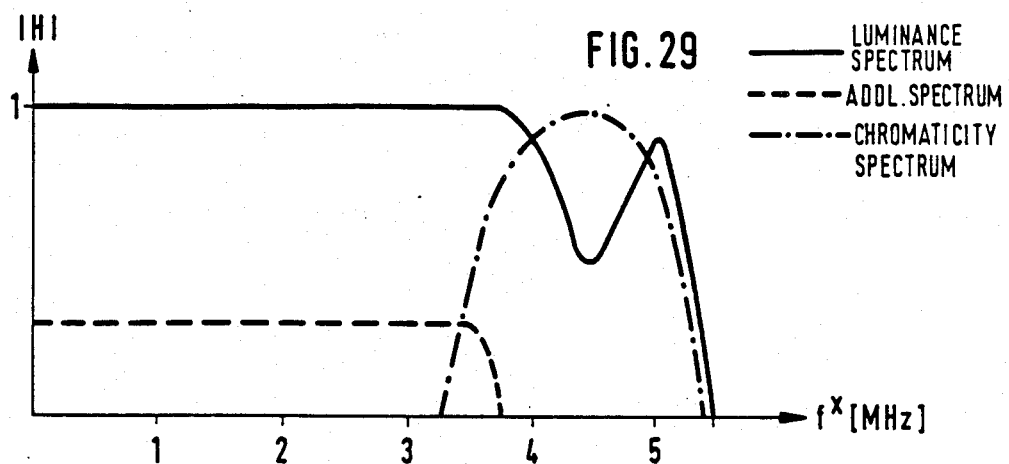
FIG. 29 is a signal diagram showing the frequency spectrum of the FBAS signal with PAL offset transmission at medium motion velocities (0.24 pel/frame < V < 2 pel/frame).
Figure 30:
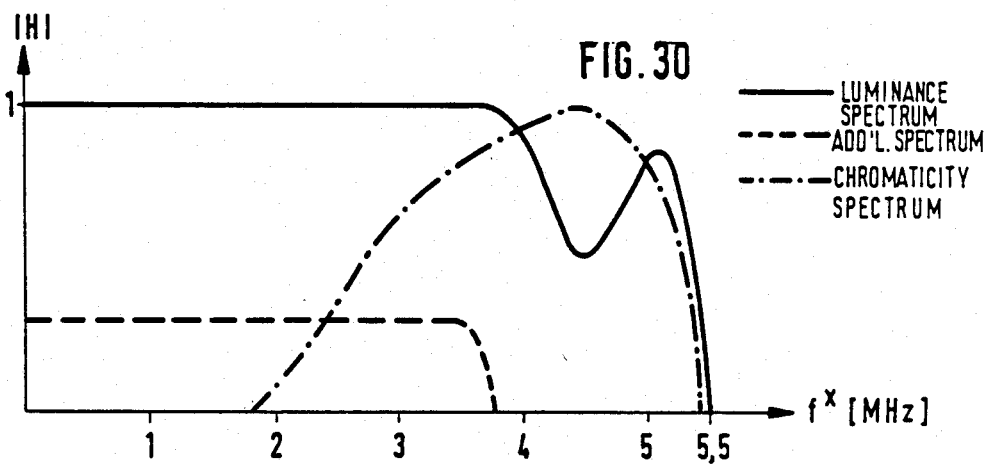
FIG. 30 is a signal diagram showing the frequency spectrum of the FBAS signal during PAL offset transmission at low motion velocities (V < 0.24 pel/frame).
Figure 31:
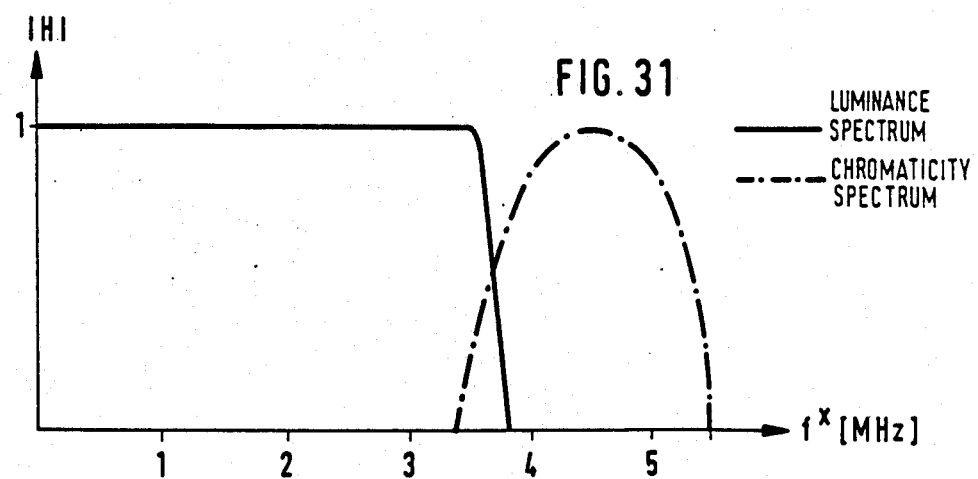
FIG. 31 is a signal diagram showing the frequency spectrum of the FBAS signal at high motion velocities (v > 2 pel/frame) during transmission at 50 frames per second.

The FBAS spectra shown in FIGS. 29 through 31 along the $f^x$ axis result from the three different velocity ranges. For lower velocities (V≦0.24 pel/frame) the spectrum shown in FIG. 30 is obtained. Although the additional spectrum and the chromaticity spectrum overlap extensively, they can be separated by time filtering. Crosstalk of the luminance component into the chromaticity channel can be avoided, as shown above, by suitable demodulation and lowpass filtering of the chrominance subcarrier signals (FIG. 13).

For medium velocities (0.24 pel/frame≦V≦2 pel/frame) the chromaticity spectrum extends only insignificantly into the region of the additional spectrum due to lowpass filtering of the chrominance subcarrier signals to 1 MHz (FIG. 29). A separation of chromaticity spectrum and additional spectrum is possible, as shown, by means of frequency multiplexing in the $f^x$ direction.

At high velocities (V>2 pel/frame) the spectrum according to FIG. 31 results. Luminance and chrominance are transmitted in frequency multiplex. Cross-effects do not occur. Therefore, the transmission of 50 frames/sec will no longer be discussed.

Figure 15:
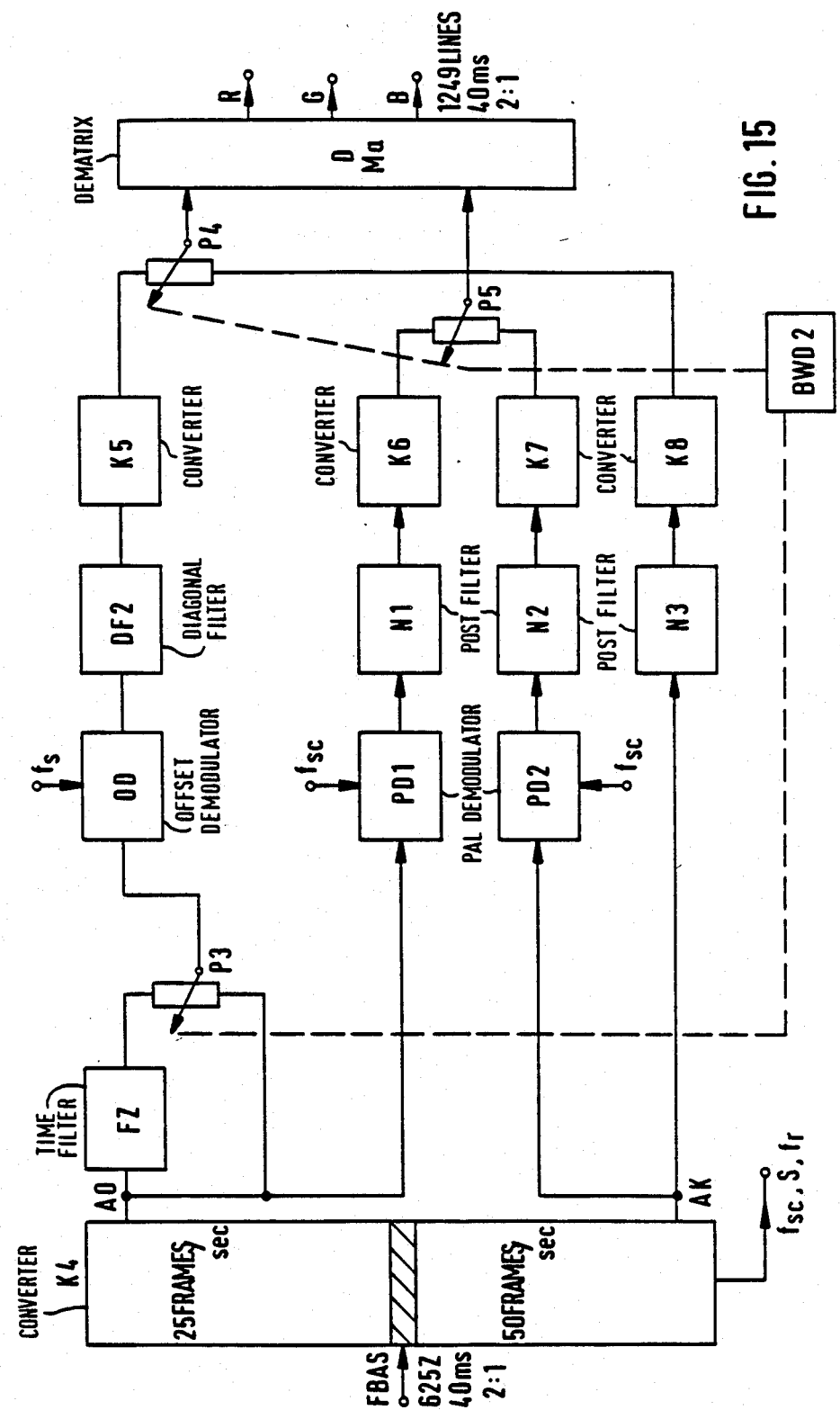
FIG. 15 is a block circuit diagram of a receiver for the motion adaptive picture transmission which can be used for implementing the method according to the invention.

FIG. 15 shows the receiver portion of a motion adaptive picture transmission according to the invention. If 25 frames/sec are being processed at the transmitter, the FBAS spectrum according to FIG. 13 is produced at the upper output AO of converter K4. In the upper portion of converter K4, fields are combined into full frames. The upper output AO of converter K4 is connected with a time filter FZ which is equipped with a first switching device, potentiometer P3, connected between its input and output.

Potentiometer P3 is controlled by motion detector BWD2 so that the output AO of converter K4 is connected directly with offset demodulator OD if medium motion velocities occur. In this case potentiometer P3 is disposed at its lower abutment. For low motion velocities, potentiometer P3 is disposed at its upper abutment so that time filtering by means of time filter FZ is fully effective. Offset demodulator OD is followed, at the receiver, by diagonal filter DF2.

For 25 frames/sec, output AO of converter K4 is connected with PAL demodulator PD1 and for 50 frames/sec output AK of converter 4 is connected with PAL demodulator PD2. PAL demodulators PD1 and PD2 differ from one another by their subcarriers. Postfilter N1 serves the purpose of permitting only the desired chromaticity spectra to pass $\pm 390$ c/ph and $\pm 234$ c/ph, see FIG. 13. In the case of PAL offset transmission the chromaticity spectra with repetition point at $\pm 390$ c/ph and $\pm 234$ c/ph are suitable for cross colour free generation of U and V signals. After demodulation of these spectra postfilter N1 effects a vertical bandlimitation with a cutoff frequency of 78 c/ph. In this way the other chromaticity spectra are rejected. Postfilter N2 at the output of PAL demodulator PD2 produces lowpass filtering of the chrominance subcarrier signals:

in the $f^x$ direction, to about 0.7 to 1 MHz;
in the $f^y$ direction, to about 78 c/ph.

Postfilter N3 at output AK of converter K4 is essentially an interpolation filter. Signal converters K5 through K8 generate a uniform signal format of 1249 lines/40 msec/2:1. The luminance signal is switched from 25 frames/sec to 50 frames/sec by means of potentiometer P4 which is likewise controlled by motion detector BWD2 and the chrominance signals are switched by means of potentiometer P5. The taps of potentiometers P4 and P5 are connected with dematrix circuit DMa.

The hexagonal luminance spectrum, the triangular additional spectra and the rectangular chromaticity spectra U and V can be seen very clearly in FIG. 13. In the $f^y$ direction, the chromaticity spectra are alternatingly repeated every 156 c/ph. Since, at the transmitter, the chromaticity spectra had been lowpass filtered in the $f^y$ direction to 78 c/ph, the U and V spectra do not overlap; they can separated from one another without errors.

The U and V signals can be obtained from the chromaticity spectra at $\pm 390$ c/ph and at $\pm 234$ c/ph by suitable demodulation and lowpass filtering to 78 c/ph. This prevents crosstalk of the luminance component into the chromaticity channel. Since the additional spectrum has already been reduced by 10 dB, crosstalk of the additional component into the chromaticity channel can be neglected. Thus, a U signal and a V signal are obtained in this way whioh are free of cross-color.

If, as shown in FIG. 13, the U and V spectra for medium velocities are lowpass filtered to about 1 MHz, additional and chromaticity spectrum are transmitted in frequency multiplex and no additional cross-luminance noise is produced during the offset demodulation with amplitude increase. For the low motion velocities where, due to the broader chromaticity spectrum in the $f^x$ direction, no frequency multiplex exists any longer, the resulting cross-luminance noise can be eliminated by time filtering.

Due to the selection of lowpass filter TP in the modified offset demodulator, the luminance spectrum is utilized to 4.4 MHz. The result is crosstalk of the chromaticity spectra at $\pm 78$ c/ph into the luminance channel (cross-luminance). However, this noise is not critical if the chrominance subcarrier signals originate from the full frame (25 frames/sec) because then the chromaticity spectra at $\pm 78$ c/ph are smaller by 6 dB than the chromaticity spectra at $\pm 390$ c/ph and at $\pm$ at 234 c/ph. If the chrominance subcarrier signals originate from 50 frames/sec, less favorable conditions result with respect to cross-luminance noise.

In the discussion above, picture processing has been described for analog signals only, therefore offset modulation and offset demodulation have been referred to. The present invention is of course also suitable for picture processing in digital signals. At the transmitter, the camera signal is then first analog/digital converted and is then processed digitally. Before transmission over a compatible, analog transmission channel ÜK the signal is digital/analog reconverted. At the receiver there occurs correspondingly first analog/digital conversion and digital signal processing until the signal reaches the monitor which either is able to directly process the digital signals (future playback monitors) or processes the signals in analog form after they have been reconverted to an analog video signal. For digital signal processing, the offset modulators and demodulators are replaced by corresponding offset samplers.

Figure 32:
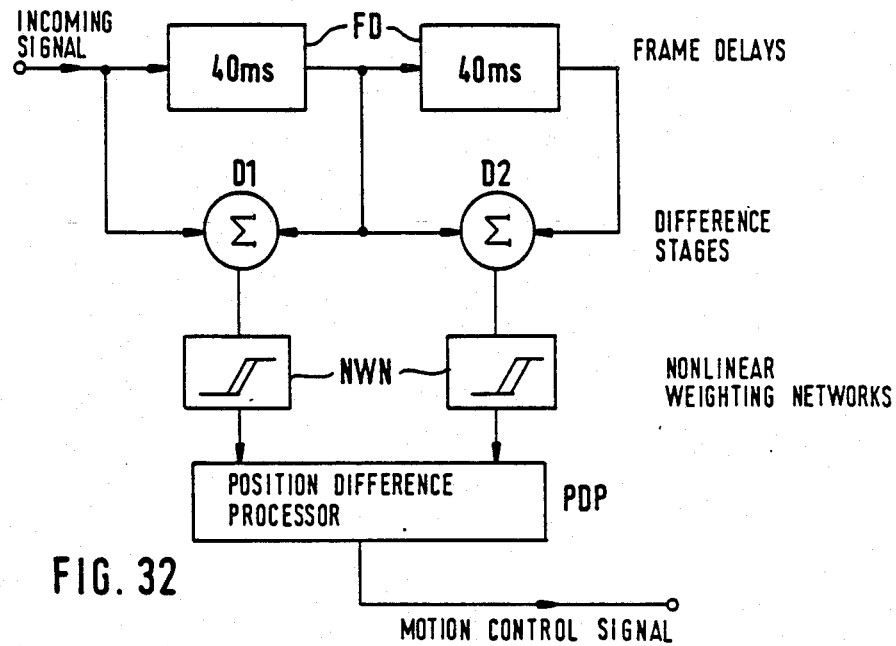
FIG. 32 is a block circuit diagram used for the motion detectors BWD1 and BWD2 according to FIGS. 14 and 15.

The circuit blocks of FIGS. 14 and 15, which were not described in details before are discussed now. The motion detectors BWD1 and BWD2 are shown in principle in FIG. 32. The incoming video signal passes two frame delays FD of 40 msec each, so that three frames are available for generating a motion control signal. In difference stages D1 and D2 a frame difference signal is generated. The two difference signals pass nonlinear weighting networks NWN to avoid noise disturbances in motion control process. The position difference processer PDP is provided with the frame difference signal and calculates the shift of horizontal and vertical position of picture details (in example a moved edge). With knowledge of this shift a direct relationship with the motion velocity is given.

Figure 33:
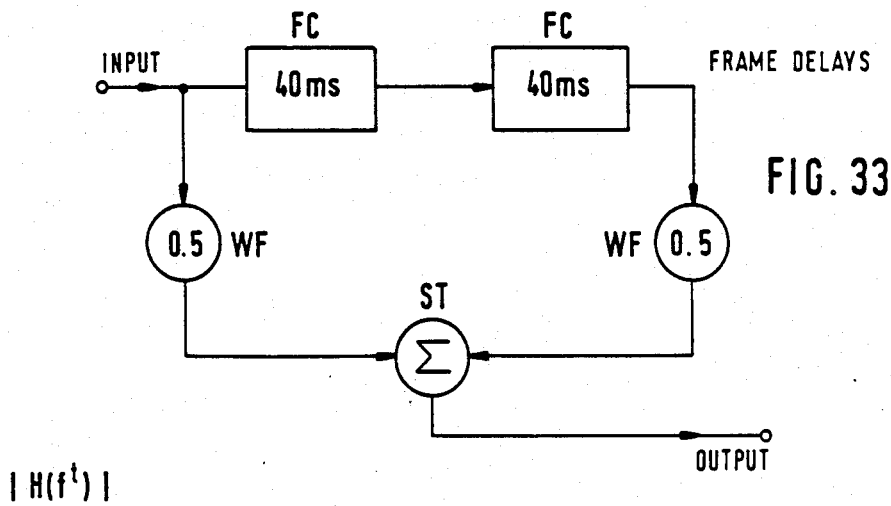
FIG. 33 is a block circuit diagram showing the time filter FZ according to FIG. 15.
Figure 34:
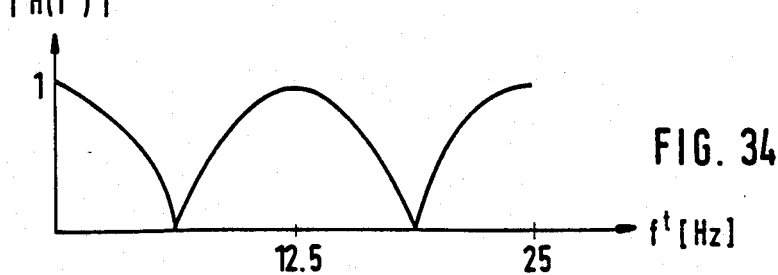
FIG. 34 is a signal diagram showing the frequency response of this time filter.

The time filter FZ shown in FIG. 33 is a nonrecursive filter with 2 taps. The input signal passes two frame delay circuits FC. Both the input signal and the delayed signal are fed to weighting circuits WF with weighting factors of 0.5 each. The weighted signals are summed in a summing stage ST. The frequency response of time filter FZ generates zeros at 6.25 Hz and 18.75 Hz as shown in FIG. 34. These are the repetition points of the chromaticity spectrum in three-dimensional representation.

Figure 35:
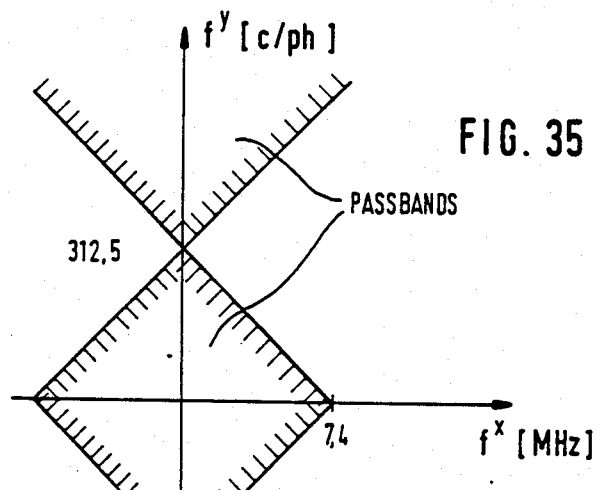
FIG. 35 is a signal diagram showing the pattern of passband and stopband areas of the diagonally filtered signal.
Figure 36:
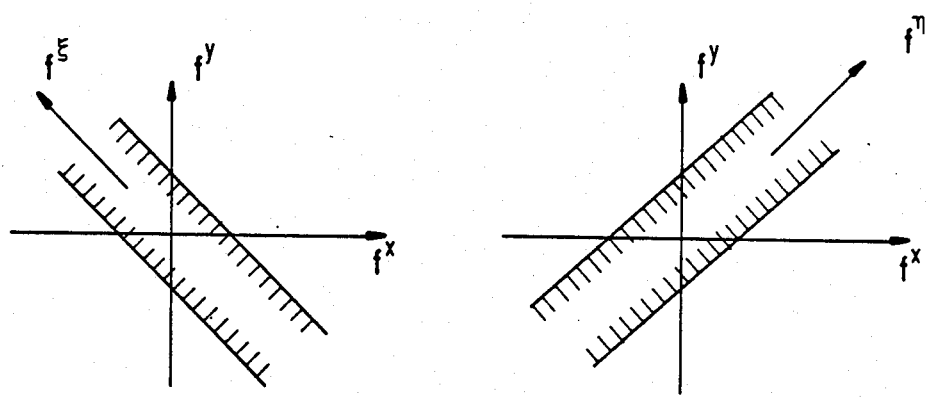
FIGS. 36a and 36b are signal diagrams showing the pattern of passband and stopband areas with one dimensional diagonal filtering.

The diagonal filters DF1 and DF2 possess the same pattern of passbands and stopbands as shown in FIG. 35. This pattern can be achieved by cascading two state of art one-dimensional filters with constant frequency response in diagonal direction. The passbands of the two one-dimensional filters are shown in FIGS. 36a and 36b. Diagonal filters DF1 and DF2 are nonrecursive.

Figure 37:
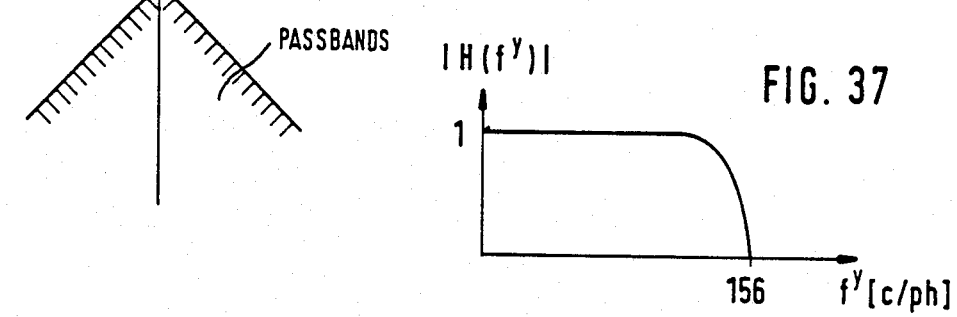
FIG. 37 is a signal diagramm showing the frequency response of post filter N3 according to FIG. 15.

Filter N3 is a post filter with a cutoff frequency of 156 c/ph. The frequency response of this filter is shown in FIG. 37. Filter N3 is nonrecursive. The purpose of filter N3 is to avoid line structure and line flicker for flat field reproduction.

The digital implementation of PAL offset transmission can be done in the following way at the transmitter end: incoming R,G,B-signals have be lowpass filtered in the direction of horizontal frequencies. The cutoff modulation frequency. After this procedure R,G,B-signals are converted from analog to digital in a A/D-converter stage sampled with twice offset modulation frequency. Every function block in FIG. 14 must be substituted by an equivalent digital block. The complete digital FBAS-signal must be D/A-converted and lowpass filtered. An equivalent procedure at the receiver end is necessary.

It will be understood that the above description of the present invention is susceptible to various modifications, changes and adaptations, and the same are intended to be comprehended within the meaning and range of equivalents of the appended claims.

What is claimed is:

1. In a method for transmitting a color television signal between a transmitting station and a receiving station of a television system and for compatibly increasing picture resolution at the receiving station, the color television containing a luminance signal and a chrominance subcarrier modulated with signals defining a chromaticity spectrum, and the picture having horizontal and vertical directions, the method including: (a) effecting planar prefiltering of the luminance signal at the transmitting station and a corresponding planar postfiltering of the luminance signal at the receiving station; (b) effecting offset sampling or offset modulation of the luminance signal at the transmitting station and a corresponding sampling conversion or demodulation of the luminance signal at the receiving station; (c) deriving an additional signal from the luminance signal for increasing picture resolution and reducing the amplitude of the additional signal at the transmitting station and transmitting the additional signal to the receiving station; and (d) increasing the amplitude of the additional signal at the receiving station to an extent corresponding to the reduction performed during the reducing step; an improvement for achieving motion adaptive picture processing at low and medium velocity of picture movement, wherein:

said step of (b) effecting offset sampling or offset modulation is effected utilizing, respectively, offset sampling or offset modulation having a frequency which is reduced to a value which (1) lies below the maximum possible resolution of the picture in the horizontal direction for offset sampling or offset moduation and which (2) is selected so that the resolution of the picture in the horizontal direction is substantlally equal to the maximum possible resolution of the picture in the vertical direction; and said method further comprises:

(e) effecting lowpass filtering of the additional signal at the transmitting station with a maximum limit frequency which substantially corresponds to the difference between the offset sampling or offset modulation frequency and the chrominance subcarrier frequency;

(f) obtaining the chromaticity spectrum for the color television signal at the transmitter from of a full frame sequence of the picture in the case when offset modulation is employed;

(g) effecting bandwidth limiting of the chromaticity spectrum of the television signal in the direction of vertical spatial frequencies at the transmitting station;

(h) filtering the luminance signal and the additional signal at the receiving station with respective filter arrangements which have complementary frequency responses; and (i) recovering the chromaticity spectrum at the receiving station from a full frame of the transmitted color television signal.

2. The method as defined in claim 1, and further comprising:

effecting time filtering of the luminance signal at the receiving station to reduce cross-luminance for low motion velocities up to 0.24 pel/frame.

3. The method as defined in claim 1, and further comprising filtering the chrominance subcarrier in the horizontal direction with a lowpass filter at the transmitting station, the lowpass filter having a frequency cut-off which is selected so that the frequencies of the additional signal and of the chromaticity spectrum do not overlap for medium motion velocities in a range of e.g. 0.24 pel/frame up to 2 pels/frame.

* * * * *